H. T. GOSS.
MULTISECTION DOOR.
APPLICATION FILED MAR. 20, 1916.

1,264,501.

Patented Apr. 30, 1918.
5 SHEETS—SHEET 1.

H. T. GOSS.
MULTISECTION DOOR.
APPLICATION FILED MAR. 20, 1916.

1,264,501.

Patented Apr. 30, 1918.
5 SHEETS—SHEET 2.

INVENTOR
Harry T. Goss
BY
E. W. Marshall
ATTORNEY

H. T. GOSS.
MULTISECTION DOOR.
APPLICATION FILED MAR. 20, 1916.
1,264,501.
Patented Apr. 30, 1918.
5 SHEETS—SHEET 3.
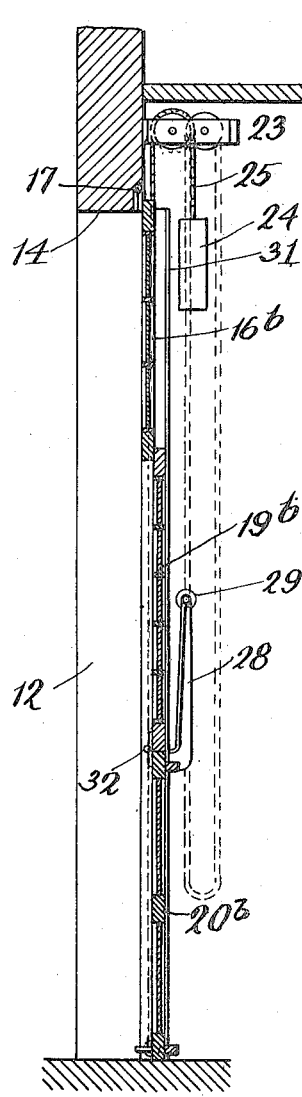
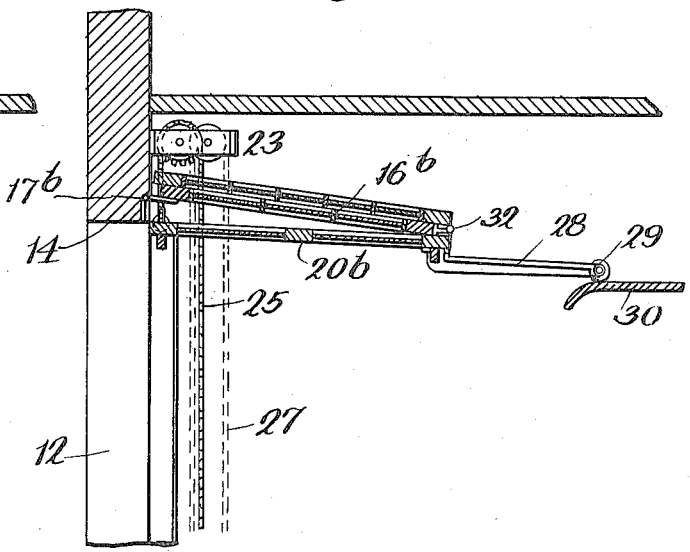
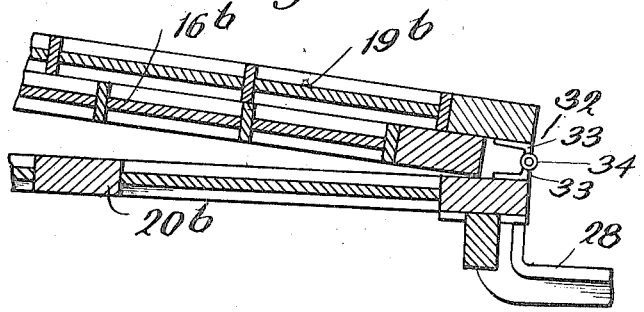
INVENTOR
Harry T. Goss
BY
E. W. Marshall
ATTORNEY

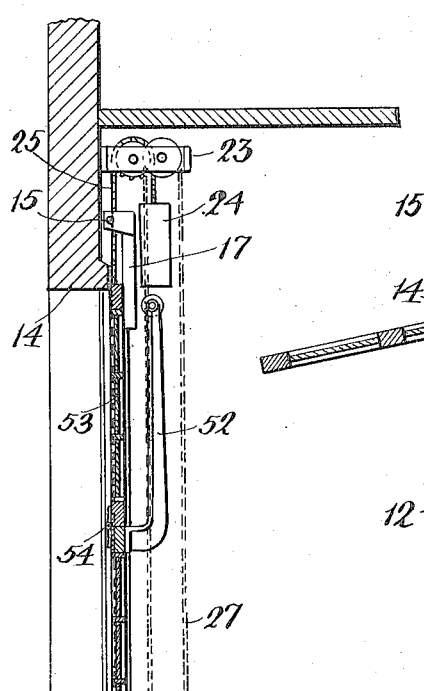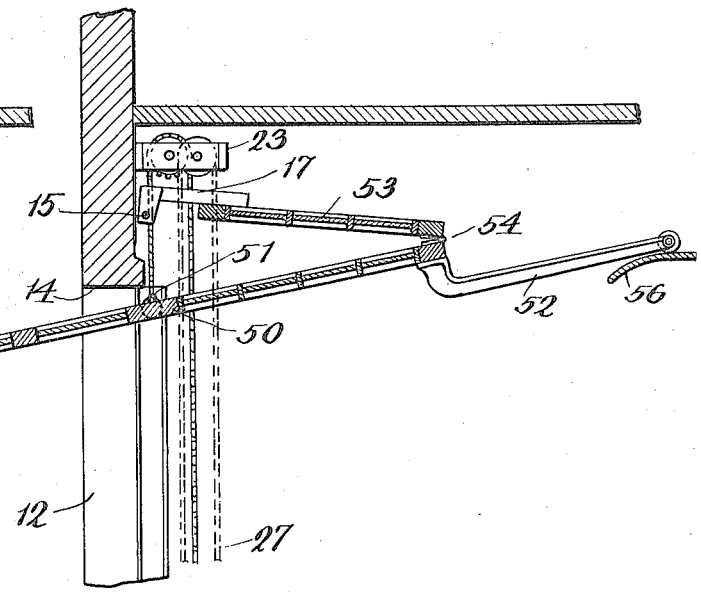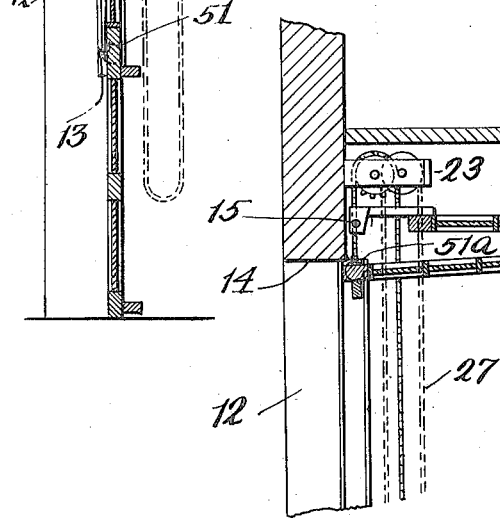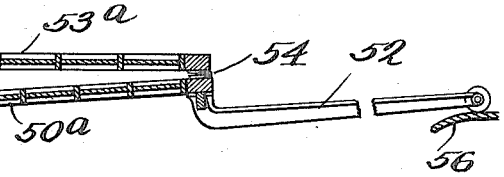

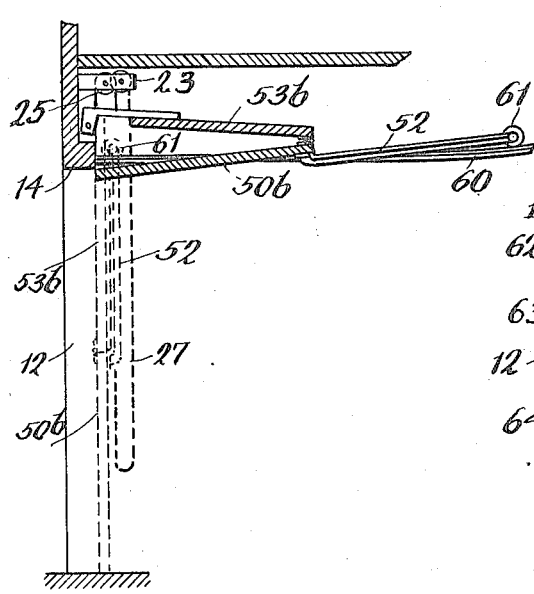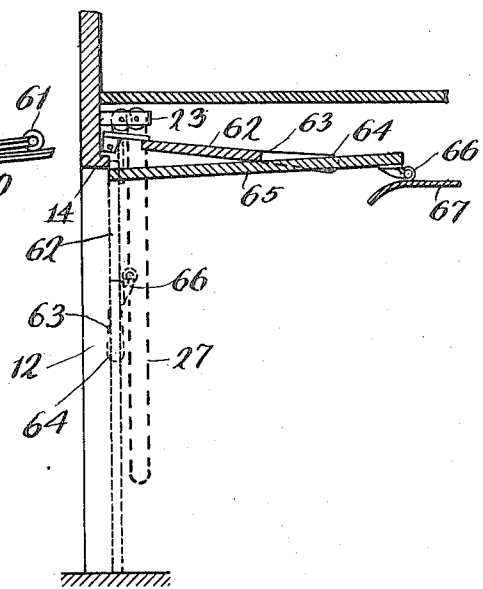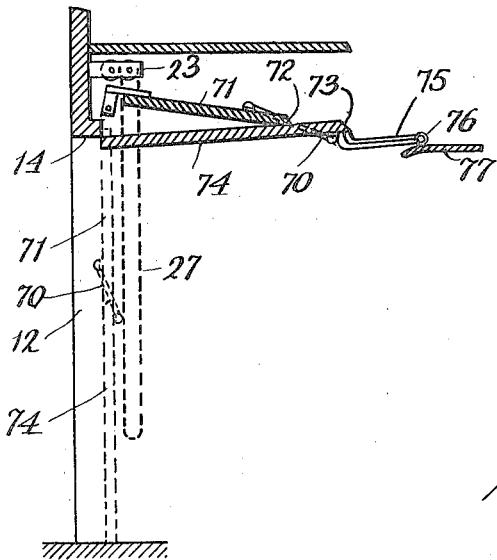

UNITED STATES PATENT OFFICE.

HARRY T. GOSS, OF RUTHERFORD, NEW JERSEY, ASSIGNOR TO GEORGE H. FROTHINGHAM COMPANY, OF NEW YORK, N. Y., A CORPORATION OF NEW YORK.

MULTISECTION DOOR.

1,264,501.        Specification of Letters Patent.      Patented Apr. 30, 1918.

Application filed March 20, 1916. Serial No. 85,285.

*To all whom it may concern:*

Be it known that I, HARRY T. GOSS, a citizen of the United States of America, and a resident of Rutherford, county of Bergen, and State of New Jersey, have invented certain new and useful Improvements in Multisection Doors, of which the following is a specification, reference being had to the accompanying drawings, forming a part thereof.

My invention relates to doors and particularly to such as comprise a plurality of coöperating sections and are adapted for use in pier sheds, warehouses, factories, and the like.

One object of my invention is to provide a door of the aforesaid character that shall be particularly adapted for use when the door opening extends relatively near to the ceiling or overhead surface, and that shall be susceptible of ready manipulation and embody means for actively supporting a material portion of the weight of the door when open.

In other words, it has been my aim to provide a door that is specially adapted for use where the overhead room is limited and equipped with means, such as the projecting arms hereinafter described, to coöperate with stationary brackets in supporting the door in its open positions.

Another object is to provide a door having an upper pivoted section and a pair of lower sections adapted to fold upon the respective sides of the upper section when open.

Other objects and advantages of my invention will be set forth hereinafter, and in order that my invention may be thoroughly understood I will now proceed to describe the same in the following specification, and then point out the novel features thereof in appended claims.

Referring to the drawings.

Figure 3:
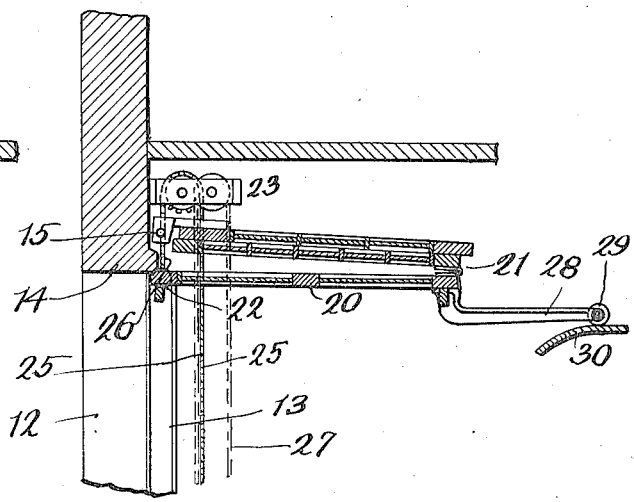
Fig. 3 is a view corresponding to Fig. 2 showing the door in its open instead of in its closed position.
Figure 4:
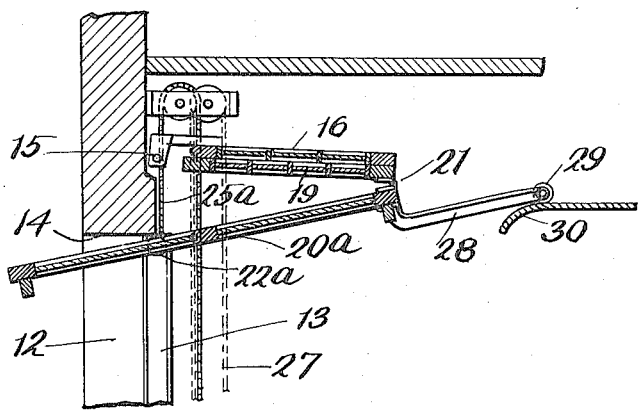

Fig. 4 corresponds to Fig. 3 but shows a slightly modified structure in which the lower section is arranged and proportioned so as to provide a canopy for the doorway.

Figure 2:
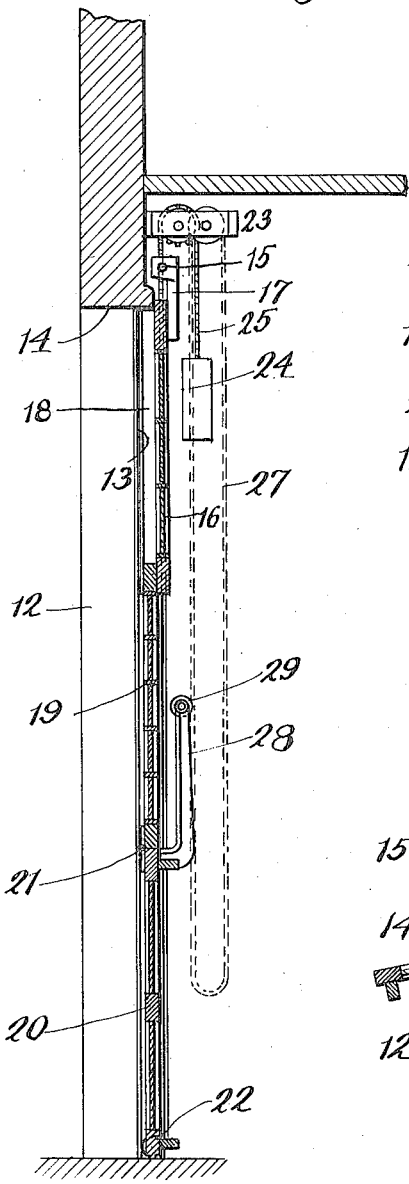
Fig. 2 is a sectional elevation of a door arranged and constructed in accordance with my invention.

Figs. 5 and 6 correspond respectively to Figs. 2 and 3, and show another modification of my invention.

The hinge connection between the lower and the intermediate sections of the same door is shown on a larger scale in Fig. 7.

My invention is illustrated in connection with a two-section door, in Figs. 8 and 9 which correspond to Figs. 5 and 6.

Fig. 10 shows a slight modification of the arrangement shown in Fig. 9.

Fig. 11 is a sectional elevation of another modification of my invention in which the stationary supports are extended to coöperate with the door projections in all positions of the door.

Fig. 12 corresponds to Fig. 11 and shows another modification in which the door sections are so proportioned and connected that one of them is adapted to coöperate with the stationary support.

Fig. 13 corresponds to Fig. 10 and shows a similar arrangement except that the door sections are joined by links instead of hinges.

Figure 1:
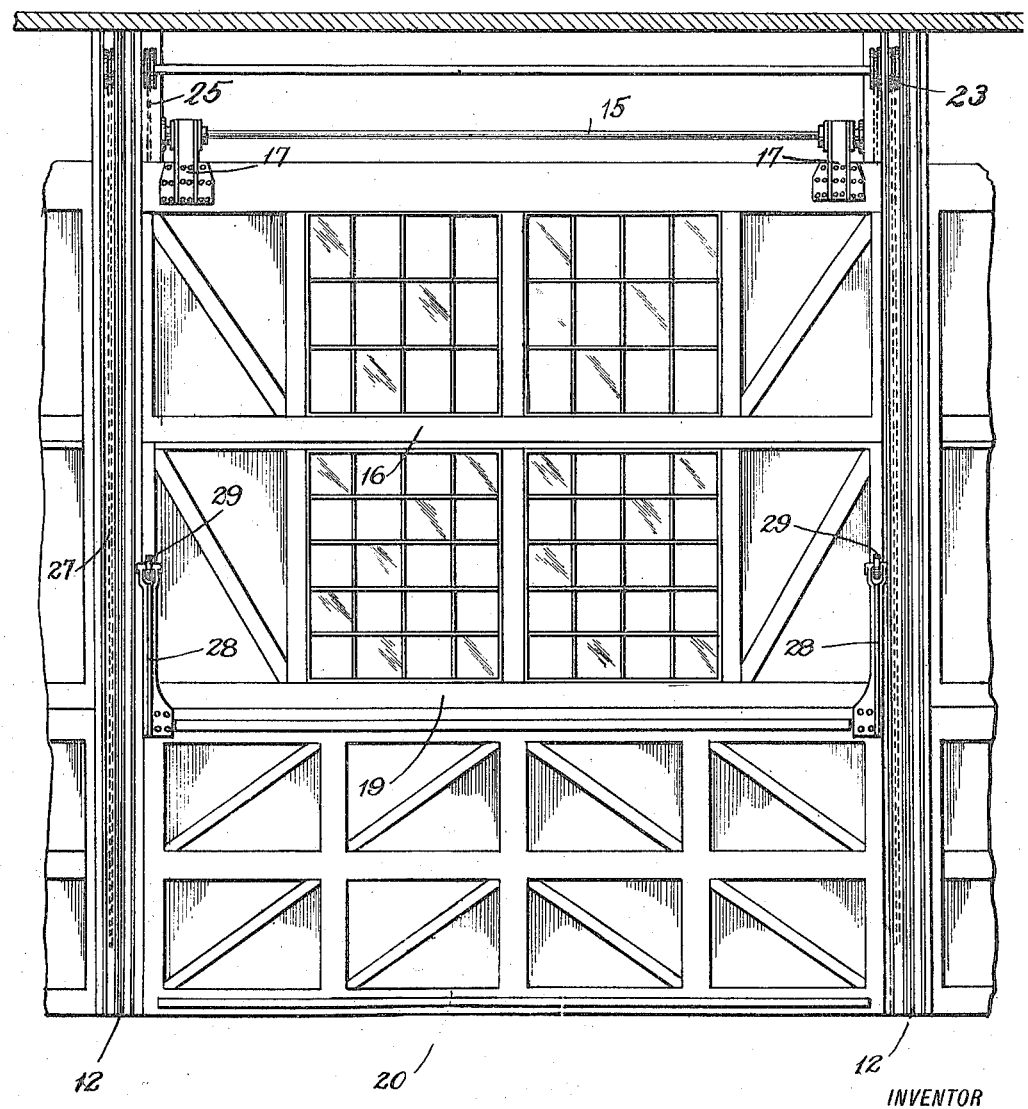
Figure 1 is a front elevation.

Special attention may first be directed to Figs. 1, 2 and 3, although like characters of reference designate corresponding parts in all the figures.

The side posts 12 which define the door opening, are provided with channels or guideways 13 and above the lintel 14 is a pivot shaft 15 from which the upper door section is suspended by brackets 17. The upper section 16 has guide channels 18 at its respective edges in which an intermediate door section 19 is adapted to slide.

The door, furthermore, comprises a bottom section 20 which is connected to the intermediate section 19 by hinges 21 and is guided near its lower corners by rollers 22 which run in the channel or guideways 13 of the door posts.

The hoisting and counterweight mechanism is indicated at 23 and may be of any suitable construction. Counterweights 24 are suspended from this mechanism by chains 25, the opposite ends of which are connected to the lower corners of the door section 20, as indicated at 26 in Fig. 3. A hand chain 27 depends from the mechanism in the usual manner and constitutes a ready means for manipulating the door.

Attached to the bottom section 20 near its upper corners are arms or projections 28 which are preferably provided with rollers 29 near their outer ends. These arms, when the door is shut, extend upwardly adjacent to the edges of the intermediate door section.

As clearly shown in Fig. 3, the rollers 29 of the arms 28 coöperate with a stationary ledge or bracket 30 and thus a considerable proportion of the weight of the door is taken by the ledge or bracket when the door is in its open position. By this means the door pivots 17 and the rollers 22 are relieved of considerable strain, because when the door is open, the points at which the guide rollers 22 engage the channels 13, are close to the pivot shaft 15 upon which the door is suspended. The center of gravity is thus at a material distance from the plane of the door opening and the weight of the section acts with considerable leverage upon the pivots and rollers. When the overhead space is limited as in the arrangement illustrated, the support is particularly important because the door pivot is necessarily close to the top of the door opening and the hinge-connected door sections fold close together. The counterweight furthermore, acts upon the door substantially at the points of engagement between the rollers and the channels and consequently the weight of the door, when open, tends to put a heavy strain both on the pivot shaft 15 and on the guide rollers and channels. The parts are largely relieved of strains of this kind by reason of the engagement of the rollers 29 with the stationary brackets 30.

From the foregoing description the operation of the door will be evident. It may be briefly outlined as folows:—assuming the parts to occupy the positions indicated in Figs. 1 and 2, if the hoist chain 27 is actuated, the intermediate and bottom sections 19 and 20 are elevated, the section 19 sliding in the guideways 18 of the upper section 16 until the upper and intermediate sections are overlapped. When the intermediate section can be elevated no farther, an upward pull on the bottom section by the hoisting mechanism causes the hinge joint between the bottom and intermediate sections to break and the door to swing into the position shown in Fig. 3. At first the bottom section 20 acts as a strut and holds the upper section, and, as already explained, when the bottom section approaches a horizontal position so that it cannot act effectively as a brace, the arm rollers 29 engage the stationary bracket 30 which then supports the door.

Attention is particularly directed to the fact that the arms 28 are comparable in length to the length of the pivoted section. The points of support are carried materially beyond the hinges 21, which is the point of connection between the lower and middle door sections, and thus an effective means is provided for automatically transferring a portion of the weight of the door to the stationary shelf or support. This is dependent upon the fact that the outer ends of the arms 28, where the rollers 29 are mounted, tend to move downwardly as the door approaches its open position shown in Fig. 3. This action would not occur if no arms were provided, or if the arms were very short the same result could not be secured.

The bottom section of the door instead of being substantially equal in length to the intermediate and top sections, may be made relatively long and the guide rollers 22 located at intermediate points in its length (as shown in Fig. 4) instead of near its lower corners. The hoisting chains $25^a$ are then attached close to the rollers with the result that when the door is opened the portion which is below the rollers $22^a$ extends outwardly through the door opening in such a way as to constitute a canopy. In order to clearly distinguish this modification from the structure of Figs. 1, 2 and 3, the parts which are modified have the same reference characters except that the letter "a" is affixed.

Special reference may now be had to Figs. 5, 6 and 7. This structure differs primarily from the structure of the previous figures on account of the fact that the upper door section $16^b$ has a guide channel 31 arranged so that the intermediate door section $19^b$ slides on top of the upper section $16^b$, considering the door in its open position, instead of on its under side.

This arrangement has the advantage that the weight of the intermediate and bottom sections $19^b$ and $20^b$, comes upon the upper door section $16^b$ directly instead of being wholly thrown upon the guide channels 18 as in the structure of Figs. 1, 2 and 3.

The intermediate and bottom sections $19^b$ and $20^b$ are connected by hinges 32 which are shown in detail in Fig. 7, each hinge having an outwardly extending member 33 so that the pivot pin 34 is spaced materially from the plane of the door. When the hinge-connected door sections $19^b$ and $20^b$ are folded as indicated in Figs. 6 and 7, there is sufficient space between the two at the hinge to admit the top door sections $16^b$ without cramping. On account of the changed location of the top section $16^b$ relative to the plane of the other two sections, hinges $17^b$ take the place of the brackets 17. The operation of this arrangement corresponds to that of the previous figures except for the fact as already noted, that the door member $19^b$ slides upon the upper side of the top section $16^b$.

The use of an arm or projection from the lower door section extending beyond the point of connection between this section and the section above, is not confined to a three-section door and in Figs. 8 to 13 inclusive this feature of my invention is illustrated in connection with two-section doors. In Figs. 8 and 9, the bottom section 50 has guide rollers 51 at intermediate points in its edges which run in the channels or guideways 13, and is provided with arms 52 which correspond to the arms 28. The door further comprises an upper section 53 which is connected to the bottom section by hinges 54. The upper section is suspended from the pivot shaft 15 by brackets 17 as in the previously described structures.

The arms 52 extend upwardly close to the upper section 53 and are substantially equal in length to this section. When the door is open they coöperate with a stationary ledge or bracket 56.

The portion of the lower section 50 which is below the rollers 51 extends outwardly when the door is open, to constitute a canopy. Of course, the portion of the door from the rollers to the hinge is substantially equal in length to the distance from the pivot shaft 15 to the hinge in the arrangement shown, but obviously, these parts will be proportioned depending upon the position of the pivot shaft and the desired position of the door sections when they are open. The counterweight and hoisting mechanism corresponds to that already described and the operation of the door is obvious in view of the foregoing description.

Fig. 10 shows a slight modification of the arrangement of Figs. 8 and 9, in that the rollers 51ª are located near the bottom corners of the bottom section 50ª instead of at an intermediate point in its length, the door comprising sections 50ª and 53ª of substantially equal length, no provision being made for a canopy. The bottom section 50ª is provided with arms 52 which permit the two door sections to be folded close together when the door is open, as in the previous arrangement.

As shown in Fig. 11 stationary rails or supports 60 may be substituted for the stationary bracket or support 56 provided the rails are so formed as to constitute a support at all times by continuously engaging the rollers 61 of the arms 52. With the parts proportioned as illustrated the rails are substantially straight except that they curve upwardly at their outer ends.

As the door is opened the rollers 61 travel outwardly on the rails and when the door is open the rails support a material proportion of the weight of the door.

Instead of providing relatively long projections from the bottom door section the arrangement shown in Fig. 12 may be utilized. As here shown the top section 62 has downwardly extending projections 63 which form rigid continuations of the door edges and are pivotally connected at 64 to the bottom section 65. As the door is opened, the upper edge of the bottom section extends materially beyond the upper section and acts like the arms 28 and 52 of the previous figures. Roller brackets 66 are preferably secured to the inner surface of the door near its upper edge as shown in the drawings, in order to provide ready means for coöperation with the stationary support 67.

The door sections instead of being hinge-connected as shown in Figs. 10 and 11, may be joined by links 70, as shown in Fig. 13. The upper section 71 in this arrangement has a beveled lower edge 72 which coöperates with an oppositely beveled edge 73 at the top of the bottom section 74. The arrangement of parts is such that when an upward pull is applied to open the door, the lower section first slides upwardly for a short distance adjacent to the upper section and then swings the upper section into a substantially horizontal position. The lower section 74 is provided with arms or projections 75 which correspond to the projections 28 and 52 and are provided with rollers 76 to coöperate with their stationary supports 77.

It is evident that while hinges in the usual meaning of this term are not employed in the modifications of Figs. 12 and 13, for example, the door sections in all of the modifications are hinge-connected, it being my intention to use the term "hinge-connected" broadly to include any equivalent means of interconnecting the sections so that they coöperate in substantially the same manner as if they were connected by ordinary hinges.

As clearly brought out in Figs. 3, 10, 11, 12 and 13, the upper door section may be pivoted close to the top of the door opening so that the hinge-connected sections fold close together into substantially horizontal planes when the door is open. It is therefore evident that doors arranged in accordance with my invention are particularly well adapted for use where the overhead room is restricted.

It is evident that my invention may be embodied in structures which vary in size and arrangement of parts from those illustrated and I therefore intend that only such limitations be imposed as are indicated in appended claims.

What I claim is:

1. A door adapted to open in restricted head room comprising an upper section pivotally suspended near the top of the door opening, a lower section with its upper edge hinge connected to the lower edge of the section above and having an arm extending materially beyond the point of connection with the lower section and means adapted to coöperate with the arm of the lower door section to receive a portion of the weight of the door when it occupies its open position.

2. A door comprising a pivotally suspended upper section, a lower section with its upper edge hinge connected to the lower edge of the section above and having an offset arm extending materially beyond the connection, and a stationary ledge or bracket adapted to coöperate with the off-set arm of the lower door section to receive a portion of the weight of the door when it occupies its open position.

3. A door comprising a pivotally suspended upper section, a lower section with its upper edge hinge-connected to the lower edge of the section above and having a pair of arms near its respective edges extending materially beyond the hinge connection parallel to the plane of the lower section, and a stationary ledge or bracket adapted to coöperate with the arms of the lower door section to receive a portion of the weight of the door when it occupies its open position.

4. A door comprising a pivotally suspended upper section, an intermediate section adapted to slide adjacent to the upper section, and a lower section hinge-connected to the intermediate section and having a member extending materially beyond the hinge connection parallel to the plane of the lower section, and means adapted to coöperate with the extension of the lower door section to receive a portion of the weight of the door when it occupies its open position.

5. In combination with a door-way having guideways on the respective side posts, a door comprising a pivotally suspended upper section having guide means, an intermediate section adapted to slide adjacent to the upper section in said guide means, and a lower section hinge-connected to the intermediate section and having a member extending materially beyond the hinge parallel to the plane of the lower section, edge projections adapted to coöperate with the guideways of the door posts, and a stationary ledge or bracket adapted to coöperate with the extension of the lower door section to receive a portion of the weight of the door when it occupies its open position.

6. A door comprising a pivotally suspended upper section, an intermediate section adapted to slide on one side of the upper section, and a lower section hinge-connected to the intermediate section and adapted to fold on the opposite side of the upper section when the door is open.

7. A door comprising a pivotally supported upper section having guideways, an intermediate section adapted to slide in the guideways on top of the upper section when said section is opened, and a lower section hinge-connected to the intermediate section and adapted to fold under the upper section when the door is open.

8. In combination with a doorway having vertical guide members on the door posts, a door comprising an upper section pivotally suspended from above the doorway, an intermediate section adapted to slide on the upper section and a lower section having rollers adapted to coöperate with the guideways of the door posts and hinge-connected to the intermediate section, whereby it folds on the opposite side of the upper section when the door is open.

9. A door comprising a pivotally suspended upper section, a lower section, a hinge fixed to the bottom of the upper section and to the top of the lower section, an arm affixed to said lower section and extending materially beyond said hinge, said hinged connection being arranged to be moved away from the door opening and the door sections to fold together upon opening the door, and means arranged to coöperate with said arm to receive a portion of the weight of the door when it is moved into its open position.

In witness whereof, I have hereunto set my hand this 17th day of March, 1916.

HARRY T. GOSS.